(No Model.)

J. ARNAO, Jr.
SHAFT COUPLING FOR VEHICLES.

No. 366,194. Patented July 12, 1887.

WITNESSES
Phil C. Dietrich
H. L. Thamblin

INVENTOR
Juan Arnao Jr
C. H. Watson & Co.
Attorneys

N. PETERS, Photo-Lithographer, Washington, D. C.

UNITED STATES PATENT OFFICE.

JUAN ARNAO, JR., OF TROY, NEW YORK, ASSIGNOR OF ONE-HALF TO JOHN P. GILLY, OF SAME PLACE.

SHAFT-COUPLING FOR VEHICLES.

SPECIFICATION forming part of Letters Patent No. 366,194, dated July 12, 1887.

Application filed April 12, 1887. Serial No. 234,524. (No model.)

*To all whom it may concern:*

Be it known that I, JUAN ARNAO, Jr., a citizen of the United States, residing at Troy, in the county of Rensselaer and State of New York, have invented certain new and useful Improvements in Shaft-Couplings; and I do hereby declare the following to be a full, clear, and exact description of the invention, such as will enable others skilled in the art to which it appertains to make and use the same.

My invention relates to an inexpensive and simple arrangement of parts pertaining to an improvement in shaft-couplings.

Its object is to save time and annoyance in attaching the shafts to the clip-box by means of a peculiarly constructed shaft-iron, bolt, and clip-box.

Figure 1:
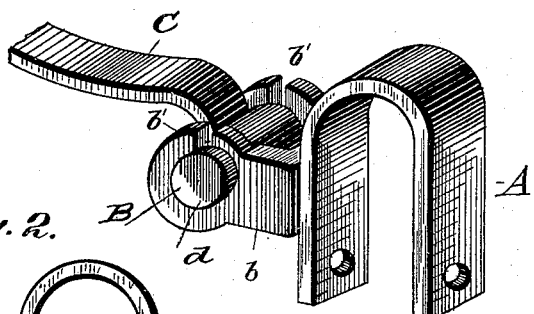
Figure 2:
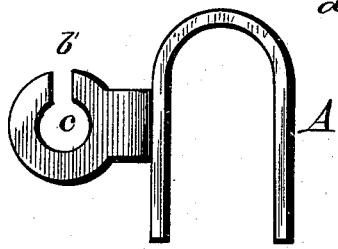
Figure 3:
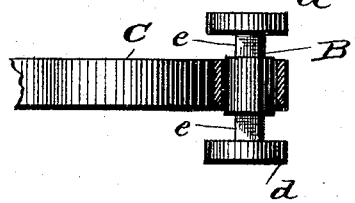
Figure 4:
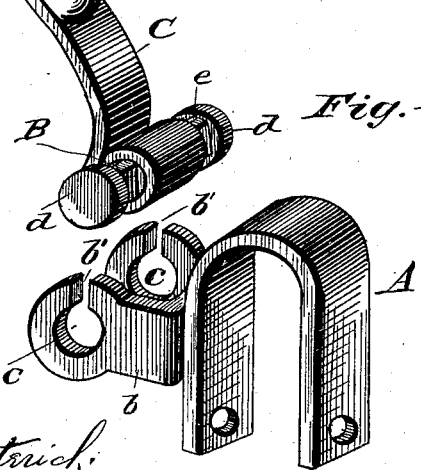

In the accompanying drawings, forming a part of this specification, Figure 1 is a perspective view of shaft-coupling, with the shaft-iron and bolt in position for use. Fig. 2 is a view of shaft clip-box detached. Fig. 3 is a view of shaft-iron bolt showing its formation; and Fig. 4 is a perspective view of clip-box with shaft-iron and bolt attached to shafts in an elevated position, with a view of adjusting the same.

A is a clip, made of suitable material, designed to surround the axle, and to be secured thereto by a clip-bar in the usual manner. The clip A is provided with ears $b\ b$, having circular journal holes or bearings $c$, with vertical slots $b'\ b'$ leading thereto, of less width than the diameter of the journal holes or bearings $c$. The shaft-iron C is made with an enlarged head, and through this head the journal-bolt B is passed; or the shaft-iron C and journal-bolt may be made in one forging or casting, as may be desired. The journal-bolt B projects on either side of the shaft-iron head, and is provided with flat or reduced portions $e\ e$ and enlarged heads $d\ d$. The reduced portions $e\ e$ of the bolt are of a width to just pass easily through the slots $b'\ b'$, and the enlarged heads $d\ d$ rest upon the outside of the ears $b\ b$.

To place in position for use, the shafts are held in a vertical position, in such a manner as to bring the journal-bolt directly over slots $b'$. They are then speedily and easily adjusted by dropping the shaft-bolts into the journals and then turning the shafts down to normal position, as when in use.

I am aware that shaft-couplings somewhat similar to mine have heretofore been proposed; but I consider the feature of having the journal-bolt made with enlarged heads to embrace the ears of the clip to possess practical advantages. Therefore What I desire to claim and cover by Letters Patent is the combination and arrangement of parts herein set forth:

A shaft-coupling clip provided with ears $b\ b$, having the slots $b'\ b'$ and round journal-holes $c$, in combination with the shaft-iron C, having an enlarged head, with journal-bolt B, having the reduced portions $e\ e$, and heads $d\ d$, substantially as described and herein set forth.

In testimony whereof I have affixed my signature in presence of two witnesses.

JUAN ARNAO, JR.

Witnesses:
ALBERTO DE CASTRO, Jr.
RAMON ARNAO.